June 7, 1949. W. W. HAMILL ET AL 2,472,421
MEANS FOR ATTACHING WHEELS TO SHAFTS
Filed Oct. 29, 1946
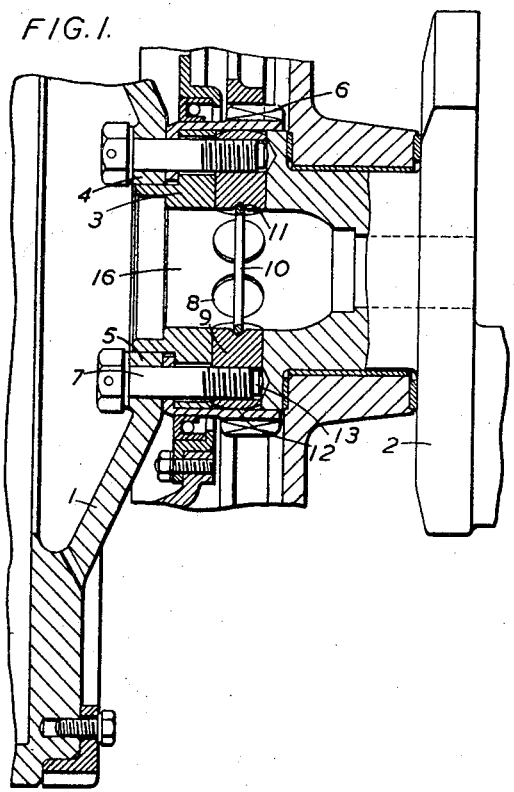
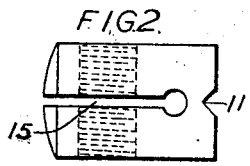
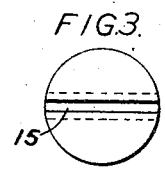
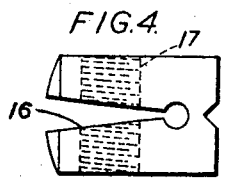
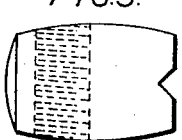
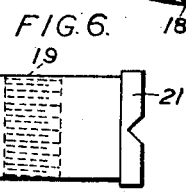

Patented June 7, 1949

2,472,421

UNITED STATES PATENT OFFICE 2,472,421

MEANS FOR ATTACHING WHEELS TO SHAFTS

William Wilson Hamill, Little Aston, and Robert Strange Crump, Birmingham, England Application October 29, 1946, Serial No. 706,332 In Great Britain November 7, 1945

11 Claims. (Cl. 287—53)

This invention relates to means for attaching wheels to shafts in a manner which allows disconnection of the parts when desired.

In some arrangements of mechanisms in which for example a flywheel is carried on a crankshaft, the weight of such rotating parts is taken on a bearing located in close proximity to the flywheel and provided with an oil seal conventionally fabricated of or including soft or resilient material in sleeve or other formation to which access is necessary from time to time.

One object of the invention is a means of attachment which provides access as aforesaid for inspection, renewal, regrinding or other maintenance operation without necessitating stripping of an engine, compressor, or the like.

A further object is to simplify the forging of the shaft; another object is to improve the grain flow during forging.

Another object is to reduce the amount of overhang relative to the bearing of an overhung wheel.

Another object is to reduce undesired stresses in the bolts used for clamping together the connected members when such bolts are tightened up.

Another object is an arrangement whereby the bolts are subject to only one major stress, which simplifies design by avoiding the problem of combined, and in some cases indeterminate, stresses.

The nut members being arranged to lie within the boundaries of the flange wherein they are housed, the wheel can be removed simply by unscrewing and detaching the bolts or set pins which having their heads on the outer face of the wheel materially facilitate accessibility as compared with the conventional disposition of bolt heads behind the flange; which involve a major disassembly for renewal of the sealing device. The diametrical dimensions of the flange can be diminished by the arrangement described, with consequential benefits to the forging operation; and additionally, the overhang of the wheel beyond the bearing and the friction radius of the sealing device are both substantially reduced. The bolts can be arranged in multiple shear and thus the minimum diameter consistent with other requirements can be employed, which allows further flange dimensional diminution.

Reference may be had to the accompanying drawings in which

Figure 1 is a sectional elevation of means according to the invention as applied to the crank shaft and flywheel of an internal combustion engine.

Figure 2 is a side elevation and Figure 3 an end elevation of a modified form of nut which may be included in means according to Figure 1.

Figures 4, 5, and 6 are side elevations of modified forms of nut.

In one convenient embodiment of the invention as applied for instance to an engine having an external overhung and enclosed flywheel 1 on one end of a crankshaft 2, the end of the shaft is formed with an integral enlargement 3 (though alternatively the enlargement may be made separately and attached) of tubular form which constitutes the flange member and is preferably machined with a spigot 4 to engage a bore in the flywheel hub 5. On the periphery of the flange may be sleeved a gear wheel 6 for driving auxiliaries or shafts, where such are incorporated in the design.

For each holding bolt 7 there is formed preferably radially in the flange a circular hole 8 to receive a preferably cylindrical nut 9 which is not a tight fit in the hole but has a clearance of a few thousandths of an inch so as to be capable of float in an endwise direction in addition to the other degrees of freedom conferred by the peripheral clearance and the shape of the periphery where it is pulled by the bolt against the seat. Thereby, the nut is able to adjust and properly align itself with the bolt during tightening up so that undesirable stresses set up from mal-alignment are substantially reduced or avoided.

To hold the nuts in positions such that the tapped holes are aligned longitudinally with the bolts and the nut threads thereby presented for easy and sure engagement with the bolt ends, a device may be incorporated consisting of a split spring ring 10 arranged in the bore of the flange to engage on its outer part a V groove 11 cut in the inner end face of each nut, the outer ends of the nuts being confined within and by the bore of the gear wheel before referred to or by that of a substitute sleeve. Angular self-aligning motion of the nuts about their axes under the reactive pressure of the expansile ring is with advantage facilitated by forming their outer end surfaces to a conical or convex configuration as shown by 12. Engagement may be further assisted by providing the entrant end 13 of each bolt with a rounded or conoidal termination and by reducing the said end for a short length say one or two threads to the core diameter. By these two expedients, assembly of the bolts is quick and easy, with a consequent saving in labour time.

The diameter of the central hole or cavity 14 in the flange is made somewhat larger than the length of a nut, permitting when the expensile ring is removed and a bolt has been unscrewed, extraction of the nut by displacing it inwards radially and then drawing it out from the cavity.

In addition to conventional means for locking the bolts, the nuts may be adapted to furnish a gripping effect on the bolt threads by a bifurcation of the nuts i. e. an axially-directed slit 15 in each nut as illustrated in Figures 2 and 3 extending from one end to a region beyond the threads. The slit 16 may be asymmetrically placed relative to the radial axis of the nut member as shown in Figure 4 with the bulk of the threads on the side 17 of the nut adjacent to the bolt head with the result that tightening of the bolt sets up a slight yielding of the weaker limb, a closing of the slit, and a frictional grip on the engaging threads. Alternatively, the arrangement may be varied so that tightening of the bolt opens the slit slightly with a similar result.

A further degree of freedom for the nut may be provided by making it of barrel configuration as depicted at 18, Figure 5, with its ends of less diameter than the middle to allow a rocking motion or displacement of its longitudinal axis in relation to the axis of the nut-accommodating hole, the contact part of the nut thus having a slightly spheroidal character. Alternatively, a segmental contact surface of like character may be incorporated with a nut having a shape other than that described. Such a surface yields a substantially universal self-adjusting motion of the nut, and if desired, the area of contact may be augmented by counterboring the bolt hole at its juncture with the nut-accommodating hole to a spheroidal contour.

According to another modification shown in Figure 6, the major portion of the cylindrical nut periphery is relieved by forming it with a waist 19 with a narrow unrelieved band 20, 21 at each end which take the pressure or pull set up by tightening the bolt and allow the intervening relieved portion to yield or distort very slightly and by consequent change of shape of the nut produce a contraction of the nut threads on to the bolt threads, and thereby a locking effect. Slots or slits may be cut into the nut to make the yielding more pronounced and directional e. g. intermediate the threads and the end bands parallel to the thread axis, parallel to the nut axis and transverse to the thread axis as before described, or both in combination. There is thus introduced into the solid body of the nut a limited degree of elastic adjustment which serves two functions, one a self-alignment leading to avoidance of undesired stresses, and another a self-locking action of bolt and nut.

It will be apparent that stresses unknown in magnitude, but under unfavourable conditions of manufacture possibly of a high order, are substantially eliminated when they arise from the cause stated, and the correct proportioning of the bolts to their duty is thus appreciably facilitated, since they may be assumed to be subject to simple tension stress only.

Where it is desirable to remove torque stress from the bolts, any suitable arrangement may be adopted e. g. sunk keys, shear dowels or cheeses in the adjacent end faces of the wheel hub and the shaft flange or an interposed flange of say the gear wheel aforesaid.

Having thus described our invention, what we claim is:

1. Overhung wheels and shafts having means of attachment including a series of holding bolts passing laterally through the wheel hub and inserted from the outer face thereof, and for each bolt a nut-accommodating space in the hub arranged in transverse relation to the hub axis and provided with a curved surface at the region towards the bolt head, and a nut member in each said space formed with a curved peripheral surface to seat against the curved surface of the space to provide a swivelling and self-aligning action of the nut member when the bolt is pulled up tight.

2. An engine crankshaft having at one end a diametrical enlargement of tubular form for attachment of an overhung flywheel adjacent to a bearing, a bore in the flywheel hub mounted on said enlargement, a series of holding bolts passing laterally through the wheel hub and inserted from the outer face thereof, circular nut-accommodating holes formed in said enlargement in transverse relation to the wheel axis, a nut in each hole provided with a curved peripheral surface in the region towards the bolt head to seat against the curved surface of the nut hole to provide a swivelling and self-aligning action of the nut member when the bolt is pulled up tight.

3. Wheel and shaft according to claim 1 in which the nut members are of bifurcate formation provided by a slit in the body of the member such that tightening of the bolt sets up a yielding of the member and a consequential frictional grip on the engaging threads.

4. Crankshaft and flywheel according to claim 2 in which the nuts are of bifurcate formation provided by a slit in the body of the nut such that tightening of the bolt sets up a yielding of the nut and a consequential frictional grip on the engaging threads.

5. Means according to claim 1 including nut members having a transverse tapped hole for engagement by the threaded end of the bolt, and a slot or slit extending longitudinally from one end of the nut to intersect the tapped hole, said slot or slit being asymmetrically placed to bifurcate the nut so that one limb contains more threads than the other limb whereby tightening of the bolt sets up a yielding of the weaker limb with a consequential frictional grip on the engaging threads.

6. Means according to claim 1 in which the nut members are of barrel configuration with the longitudinal axis transverse to the axis of the threaded hole.

7. Means according to claim 1 including nut members having a transverse tapped hole for engagement by the threaded end of the bolt, a relieved portion intermediate their ends, and a narrow unrelieved band at each end to allow the intervening relieved portion to yield and produce a locking effect when the bolt is tightened.

8. Wheel and shaft according to claim 1 wherein the end of the shaft is provided with a cavity having a transverse dimension in excess of the length of a nut member to permit removal of a nut member by displacing it inwards into and then withdrawing it from the cavity after the bolt is unscrewed.

9. Crankshaft and flywheel according to claim 2 wherein the end of the shaft is provided with a cavity having a transverse dimension in excess of the length of a nut to permit removal of a nut by displacing it inwards into and then withdrawing it from the cavity after the bolt is unscrewed.

10. Means for attaching an overhung wheel to a shaft including a cavity in the end of the shaft, holes in said cavity extending from periphery to bore thereof, a nut seated in each hole and insertable or withdrawable by way of the bore of the cavity, and holding bolts passing laterally through the wheel hub with their heads adjacent the outer face thereof to engage the respective nuts.

11. Means according to claim 10 including a cavity in the shaft end having a transverse dimension in excess of the length of a nut member, a transverse groove at the inner end of each nut, an abutment for the outer ends of the nuts consisting of a sleeve encircling the said tubular part, and spring means engaging the nut grooves to align the nut threads with their respective bolt ends.

WILLIAM WILSON HAMILL.
ROBERT STRANGE CRUMP.

REFERENCES CITED

The following references are of record in the file of this patent:

UNITED STATES PATENTS

| Number | Name | Date |
|---|---|---|
| 296,017 | Jordan | Apr. 1, 1884 |
| 470,995 | Duchemin | Mar. 15, 1892 |
| 973,144 | Staples | Oct. 18, 1910 |
| 1,337,271 | Regnier | Apr. 20, 1920 |
| 1,671,757 | Allen | May 29, 1928 |